United States Patent [19]

Hendrickson

[11] 4,168,082
[45] Sep. 18, 1979

[54] HITCH FOR A TRAILER

[75] Inventor: Richard T. Hendrickson, South Bend, Ind.

[73] Assignee: The Bendix Corporation, Southfield, Mich.

[21] Appl. No.: 921,918

[22] Filed: Jul. 3, 1978

[51] Int. Cl.² .............................................. B60D 7/00
[52] U.S. Cl. ................................. 280/476 R; 280/442
[58] Field of Search ............... 280/476 R, 446 B, 442, 280/767, 724, 691, 86

[56] References Cited

U.S. PATENT DOCUMENTS

| | | | |
|---|---|---|---|
| 2,498,780 | 2/1950 | Winchester | 280/442 X |
| 3,722,920 | 3/1973 | Reese | 280/446 B |
| 3,785,680 | 1/1974 | Good et al. | 280/446 B |
| 3,834,480 | 9/1974 | McGee | 180/135 |

*Primary Examiner*—Joseph F. Peters, Jr.
*Assistant Examiner*—R. Schrecengost

*Attorney, Agent, or Firm*—Leo H. McCormick, Jr.; Ken C. Decker

[57] ABSTRACT

A hitch for connecting a trailer to a tow vehicle. The hitch has a beam attached to the tow vehicle for transmitting a load having vertical and horizontal components between the trailer and the tow vehicle. A bearing retained in a guide is connected to the beam by a rack and pinion connection. A shaft retained by the bearing has a yoke pivotally attached to the end thereof for connecting a ground wheel to the beam. By changing the position of the rack with respect to the pinion, the distance between the beam and wheel can be adjusted to distribute a selected portion of the vertical component of the load into the wheel. A linkage connects the tow vehicle to the shaft for maintaining the wheel in alignment with the tow vehicle to allow the wheel to resist the development of lateral forces between the tow vehicle and the trailer as a function of the vertical component of the load carried by the ground wheel.

8 Claims, 3 Drawing Figures

HITCH FOR A TRAILER

BACKGROUND OF THE INVENTION

The sizes of passenger cars manufactured in the United States have decreased in the past few years. Most of the size decrease has been through a reduction in the size of the trunk. An even further size reduction is anticipated within the next decade which could essentially eliminate the trunk as a place for the transportation of luggage. Since a majority of vehicle owners have become accustomed to traveling distances requiring overnight stops, it has been suggested that small cargo trailers could offer a solution to the transportation of luggage. However, it is important that stability be maintained between the towing vehicle and the trailer, especially when travelling above 50 miles per hour.

One form of instability exhibited by tow vehicle-trailer combinations currently available has been trailer sway. Swaying causes the trailer to oscillate in a manner similar to the movement of a pendulum. This instability often causes severe yawing in the trailer which can lead to loss of steering control of the tow vehicle. With the anticipated weight reduction of future vehicles, the loss of steering control from such instability could be accelerated.

To alleviate sway instability, some trailers have been equipped with dampening devices attached to the hitch such as the shock absorbers located on opposite sides of the hitch as disclosed in U.S. Pat. No. 3,722,920, and the friction disc arrangement disclosed in U.S. Pat. No. 3,785,680. These anti-sway devices operate sufficiently as long as the tow vehicle-trailer is moving in a straight line. However, when it is desired to turn the tow vehicle-trailer combination, the tow vehicle must overcome the resistance of the anti-sway devices.

In an effort to overcome the turning resistance of anti-sway devices, a power cylinder, disclosed in U.S. Pat. 3,834,480, is operationally responsive to the fluid in a power steering system for allowing the trailer to track the tow vehicle during turning operations.

In all the known prior art devices, the stability of the tow vehicle-trailer combination is dependent on the ability of the tow vehicle to dampen the instability. Unfortunately, with the anticipated reduction in weight of future passenger cars such stability will be reduced.

SUMMARY OF THE INVENTION

It has been discovered that the stability of a tow vehicle-trailer combination can be maintained regardless of the weight of the tow vehicle if the vertical load of the trailer is carried by the trailer. Thus, a nose wheel which tracks the tow vehicle, was added to the trailer by modifying the hitch connection in accordance to the principle of this invention.

The hitch connection has a beam that carries both the horizontal and vertical components of a load from the trailer to the tow vehicle. A guide attached to the beam aligns a bearing member of a vertical shaft with the beam. A yoke attached to the vertical shaft has an axle on which the nose wheel is mounted. A rack on the bearing member engages a pinion connected to the beam. Rotation of the pinion moves the rack to allow a desired portion of the vertical component of the load to be transferred into the nose wheel. A tie rod linkage with a screw shackle connects the shaft with the tow vehicle causing the nose wheel to track the tow vehicle.

In operation, whenever a sway condition exists, any lateral forces developed thereby are resisted by the action of the vertical force of the load carried by the nose wheel. However, during a turn or steering maneuver, the nose wheel is turned through the tie rod linkage allowing the tow vehicle-trailer combination to turn in substantially a uniform arc.

It is an object of this invention to provide a tow vehicle-trailer combination with a sway control stabilizer that resists the creation of lateral forces between the tow vehicle and the trailer while allowing unrestricted steering maneuvers initiated through the operation of the tow vehicle.

It is a further object of this invention to provide a trailer with an adjustable member for selectively diverting a portion of the vertical component of a load from a tow vehicle into a nose wheel.

It is a further object of this invention to provide a trailer with a steering mechanism to maintain a preset alignment between a nose wheel and a tow vehicle permitting the trailer to follow substantially the same turning arc of the tow vehicle.

These and other objects should be apparent from reading this specification while viewing the drawings.

DETAILED DESCRIPTION

Figure 1:
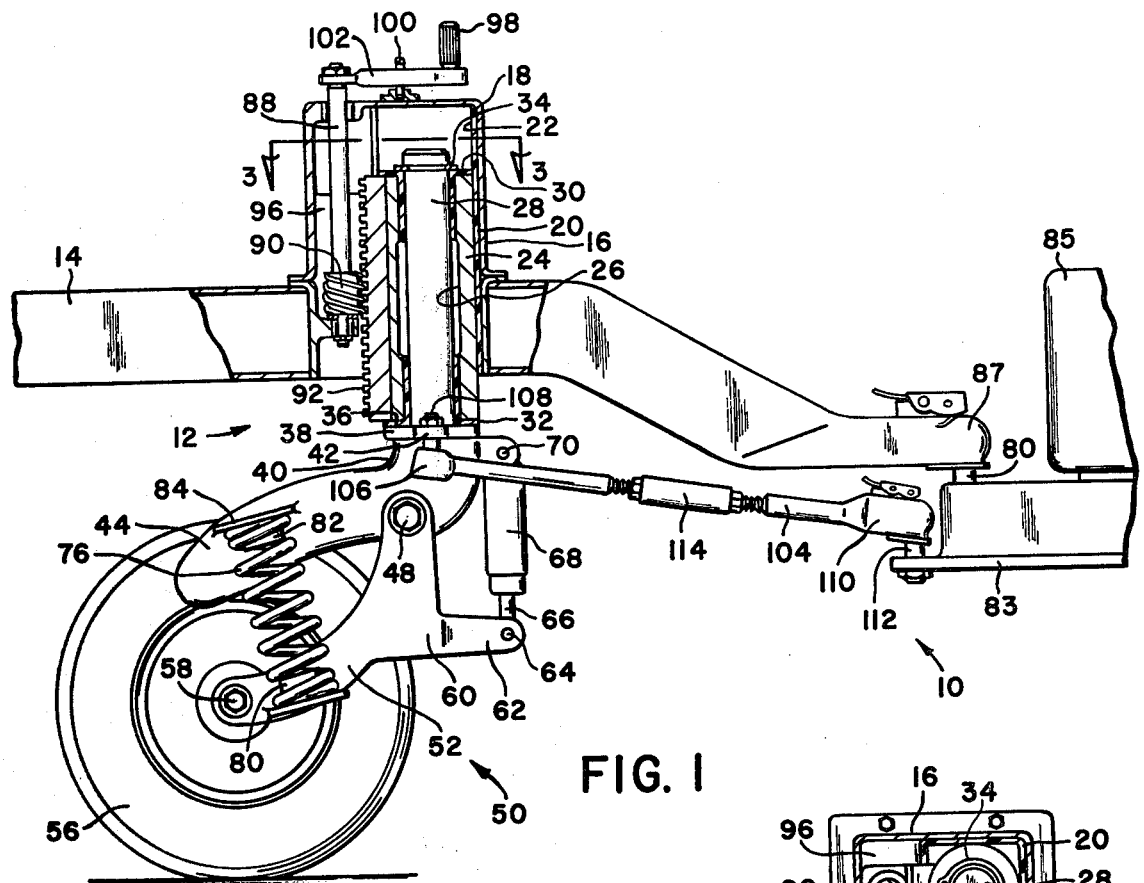
FIG. 1 is a schematic illustration of a hitch connection for a tow vehicle-trailer combination made according to the principles of this invention.

The tow vehicle-trailer combination shown in FIG. 1 has a nose wheel assembly 12 attached to the tongue or beam 14 of the trailer for carrying a portion of the vertical load associated with the trailer.

The nose wheel assembly 12 has a housing 16 with a rectangular opening 18 therethrough. A plastic sleeve 20 which lines the rectangular opening 18 forms a bearing surface 22 for bearing 24. Bearing 24 has a cylindrical bore 26 therethrough for aligning a vertical shaft 28 in a substantially perpendicular position with respect to beam 14. First and second cylindrical members 30 and 32 surround shaft 28 and engage bearing 24 to provide a smooth surface which permits shaft 28 to freely rotate with respect to bearing 24. A snap ring 34 located in a groove on shaft 28 holds cylindrical member 30 against bearing 24 and cylindrical member 32 against shoulder 36 on bracket 40 fixed to shaft 28.

Bracket 40 has a base plate 38 fixed to shaft 28 for aligning first and second arms 44 and 46 in a plane substantially at a right angle with projection 42 extending from base plate 38. First and second arms 44 and 46 have a bore extending therethrough which is offset from the axial center of shaft 28. A pivot pin 48 extends through the offset bore of the bracket 40 for attaching a yoke member 50 to the shaft 28.

Figure 2:
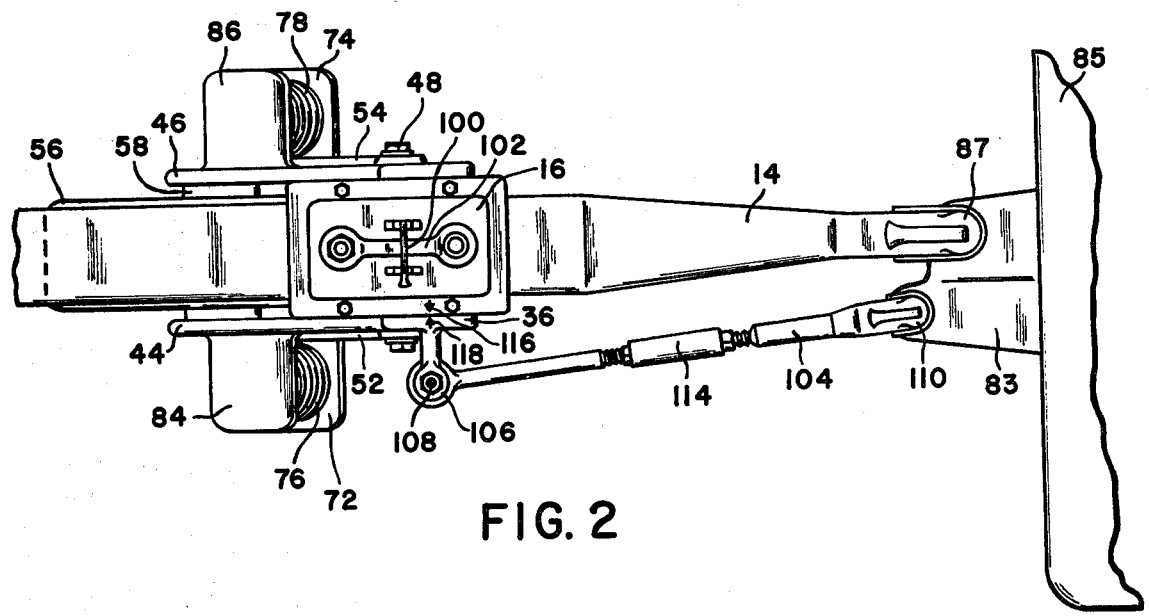
FIG. 2 is a top view of the hitch connection of FIG. 1.

The yoke member 50 includes first and second arcuate members 52 and 54 that surround wheel 56, see FIG. 2, and is attached thereto by axle 58. The yoke member 50 further includes a base or spacer member 60 that joins the first and second arcuate members 52 and 54 together. Projections 72 and 74 are attached to members 52 and 54 adjacent axle 58, respectively. Each of the projections 72 and 74 have guides, only 80 is shown, for holding springs 76 and 78 in alignment with corresponding guides, only 82 is shown, on projections 84 and 86, respectively, extending from first and second arms 44 and 46.

A projection 62 which extends from spacer or base 60 of yoke member 50 has a pin 64 attached thereto for fixing one end 66 of a piston in shock absorber 68 to the yoke member 50. The cylindrical housing of shock absorber 68 is attached to base 38 of bracket 40 by a pin 70. The shock absorber 68 limits the rotative movement of yoke member 50 about pivot 48 in response to vertical oscillations caused by springs 76 and 78 reacting to the engagement of wheel 56 with rough surfaces.

Figure 3:
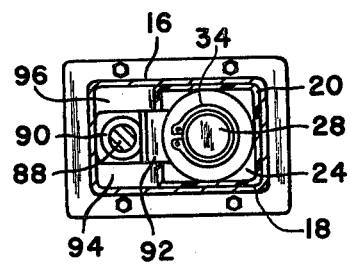
FIG. 3 is a sectional view taken along line 3—3 of FIG. 1.

The amount of the vertical load component carried through wheel 56 is dependent on the distance between beam 14 and axle 58 after socket 87 on beam 14 is fastened to knob 80 on bumper 83 of the tow vehicle 85. The relationship between beam 14 and axle 58 can be adjusted through the rotation of crank 88 which is attached to beam 14 to move rack 92 on bearing 24 with respect to pinion gear 90. Rack 24 is held in engagement with pinion 90 through guides 94 and 96, see FIG. 3. Whenever the distance between beam 14 and axle 58 has been adjusted for the load in the trailer, locking pin 100 snaps over arm 102 and prevents further rotation of the pinion 90 with respect to the rack 92.

In order to assure that wheel 56 follows the tow vehicle 85 at all times, a tie bar linkage 104 connects arm 42 on bracket 40 with the tow vehicle. The tie bar linkage 104 has a first end 106 with a ball type connection that permits both horizontal and vertical rotation about pin 108 and a second end 110 with a locking socket connection that is mounted on ball 112 on the bumper 83 of the tow vehicle. A screw socket 114 permits the length of the tie bar linkage 104 to be adjusted in order that wheel 56 is in parallel alignment with the wheels of the tow vehicle.

MODE OF OPERATION

When the trailer is disconnected from the tow vehicle, the entire vertical load in the trailer that is present in beam or hitch 14 is carried through shaft 28 to the wheel 56. In this condition, springs 76 and 78 could be compressed until shock absorber 68 reaches its full extended position if the safe load on the trailer were exceeded. However, normally springs 76 and 78 would not be so compressed.

Prior to connecting beam 14 of the hitch to the bumper 83 of the tow vehicle, it may be desirable to move rack 92 and attached bearing 24 with respect to the pinion and beam 14 to raise socket 87 to a height greater than ball 80 on the bumper 83. Once socket 87 is aligned with ball 80, pinion 90 is rotated by crank 88 to remove a portion of the vertical load from wheel 56 and transmit the same to the tow vehicle 85 through beam 14. When a desired portion of the vertical component of the load on the trailer is transferred to the tow vehicle 85 as determined by the distance between beam 14 and axle 58, rotation of crank 88 terminates and handle 102 locked in place by locking pin 100.

Thereafter, the tow vehicle-trailer combination can be moved in a straight line a short distance to align wheel 56 with the wheels on the tow vehicle. The tie bar linkage 104 is then attached to ball 112 by coupling socket on end 110. By adjusting screw socket 114 until notch or arrow 118 on the front endge of base plate 38 is aligned with notch or arrow 116 on housing 16 so that the wheel 56 is fixed in a line parallel to the wheels of the tow vehicle and beam 14.

When the tow vehicle-trailer combination is traveling on a road, tie bar linkage 104 holds wheel 56 in alignment with the wheels of the tow vehicle. Should a sway condition occur in the trailer, lateral forces are generated and transmitted to beam 14. However, the portion of the vertical force carried through shaft 28 to wheel 56 resists lateral movement since tie bar linkage 114 maintains the wheel 56 in direct alignment with the tow vehicle. Thus, before such lateral forces being transmitted into the tow vehicle the component of the vertical force of the load on the trailer and the solid linkage of the tie bar linkage 114 must be overcome.

However, should the operator desire to turn the tow vehicle-trailer combination, a steering input to the tow vehicle causes the bumper 83 to pivot about socket connection 87 and correspondingly rotate shaft 28 in bearing 24 through the action of tie bar linkage 104 on arm 42 to maintain wheel 56 in alignment with the front or steering wheels of the tow vehicle. Thus, the trailer follows the tow vehicle in a substantially uniform turning arc under all conditions wherein the lateral movement of the trailer is initiated in the tow vehicle.

I claim:

1. In a tow vehicle-trailer combination, a hitch for connecting the trailer to a fastener on the tow vehicle comprising:

a beam attached to the fastener for transmitting a load having vertical and horizontal components from the trailer to the tow vehicle;

a shaft connected to said beam;

a yoke member secured to said shaft;

a wheel connected to said yoke member;

adjustment means connected to said shaft and said beam for distributing a portion of said vertical component of the load into said wheel;

a bearing member surrounding said shaft for maintaining said shaft in a substantially uniform vertical alignment with respect to said beam;

a rack attached to said bearing member;

a guide attached to said beam to prevent said rack from rotating;

a pinion attached to said beam and engaged with said rack;

a crank for rotating said pinion to move said rack with respect to said beam and change the distance between said wheel and said beam; and linkage means connected to the tow vehicle and said shaft for maintaining said wheel in alignment with the tow vehicle to allow said wheel to resist the creation of lateral forces between the tow vehicle and the trailer as a function of said portion of said vertical component of the load carried through said wheel.

2. In a tow vehicle-trailer combination, as recited in claim 1, wherein said adjustment means further includes:

a lock member for maintaining said crank in a substantially fixed position once the desired distance between said beam and wheel has been established.

3. In the tow vehicle-trailer combination, as recited in claim 2 wherein said linkage means includes:

a screw shackle for realignment of said wheel with the tow vehicle with changes in the load in the trailer.

4. In the tow vehicle-trailer combination as recited in claim 3, further including:
spring means connected to said yoke and said shaft for allowing said wheel to move independently of said beam in response to engagement with rough road surfaces.

5. In the tow vehicle-trailer combination as recited in claim 4, further including:
a shock absorber connected to said yoke and said shaft to attenuate independent vertical movement of the wheel.

6. In the tow vehicle-trailer combination as recited in claim 3 further including:
a projection extending from said shaft; and
a ball joint secured to said projection and connected to said linkage means, said linkage means transmitting a steering signal from the tow vehicle to said wheel through said ball joint, projection, and shaft.

7. In the tow vehicle-trailer combination, as recited in claim 6, further including:
bracket means attached to said shaft for retaining said spring means.

8. In a tow vehicle-trailer combination, a hitch for connecting the trailer to a fastener on the tow vehicle comprising:

a beam attached to the fastener for transmitting a load having vertical and horizontal components from the trailer to the tow vehicle;
a shaft connected to said beam;
a yoke member secured to said shaft including a housing having a first arm, a second arm, and a third arm secured thereto, said first and second arms each having a first end secured to said shaft by a pivot pin and a second end secured to said wheel by an axle, said third arm being connected to said shaft through a shock absorber;
first and second brackets secured to said first and second arm, respectively, adjacent said axle connection for retaining first and second springs, respectively, said first and second springs modifying the effect of engagement of said wheel with rough surfaces to provide a smooth ride in the trailer;
a wheel connected to said yoke member;
adjustment means connected to said shaft and said beam for distributing a portion of said vertical component of the load into said wheel; and
linkage means connected to the tow vehicle and said shaft for maintaining said wheel in alignment with the tow vehicle to allow said wheel to resist the creation of lateral forces between the tow vehicle and the trailer as function of said portion of said vertical component of the load carried through said wheel.

* * * * *